United States Patent
Edwards (10) Patent No.: US 10,026,103 B2
(45) Date of Patent: Jul. 17, 2018

(54) TIME-TRIGGERED ADVERTISEMENT REPLACEMENT

(71) Applicant: Excalibur IP, LLC, New York, NY (US)

(72) Inventor: Dustin Edwards, Champaign, IL (US)

(73) Assignee: Excalibur IP, LLC, New York, NY (US)

(*) Notice: Subject to any disclaimer, the term of this patent is extended or adjusted under 35 U.S.C. 154(b) by 664 days.

(21) Appl. No.: 14/540,591

(22) Filed: Nov. 13, 2014

(65) Prior Publication Data
US 2015/0066656 A1    Mar. 5, 2015

Related U.S. Application Data

(63) Continuation of application No. 12/973,954, filed on Dec. 21, 2010, now Pat. No. 8,918,331.

(51) Int. Cl.
G06Q 30/00    (2012.01)
G06Q 30/02    (2012.01)

(52) U.S. Cl.
CPC ............... *G06Q 30/0272* (2013.01)

(58) Field of Classification Search
None
See application file for complete search history.

(56) References Cited

U.S. PATENT DOCUMENTS

| | | | | |
|---|---|---|---|---|
| 5,283,731 | A * | 2/1994 | Lalonde ............... | G06Q 30/06 379/100.11 |
| 6,381,637 | B1 * | 4/2002 | Kamada ............ | G06F 17/30899 707/E17.119 |
| 6,879,994 | B1 * | 4/2005 | Matsliach .......... | G06F 11/3495 709/204 |
| RE39,652 | E * | 5/2007 | Oashi ................... | G11B 27/034 345/475 |
| 7,778,636 | B2 * | 8/2010 | Rolf .................. | G06F 17/30749 455/426.1 |
| 2001/0039510 | A1 * | 11/2001 | Galomb ................ | G06Q 30/02 705/14.73 |
| 2002/0007314 | A1 * | 1/2002 | Maruyama ............ | G06Q 30/02 705/14.68 |
| 2002/0104083 | A1 * | 8/2002 | Hendricks .............. | H04H 20/10 725/34 |
| 2002/0184623 | A1 * | 12/2002 | Hodge ............... | H04N 5/44591 725/37 |
| 2003/0195801 | A1 * | 10/2003 | Takakura .............. | G06Q 30/02 705/14.66 |
| 2004/0055016 | A1 * | 3/2004 | Anipindi ................ | H04H 20/82 725/110 |

(Continued)

*Primary Examiner* — Matthew T Sittner
(74) *Attorney, Agent, or Firm* — Brinks Gilson & Lione (57) ABSTRACT

A system to place online advertisements on a first page includes a display output to render a primary advertisement on at least a portion of a first web page and a timer to measure a first predetermined period of time that the first web page is displayed. The system includes an advertisement controller, coupled to the display output and the timer, to switch the primary advertisement to display a secondary advertisement on the portion of the first web page. The advertisement controller is further responsive to a request to recall the primary advertisement after the switching has occurred and to switch the secondary advertisement with the primary advertisement.

20 Claims, 5 Drawing Sheets

(56) References Cited

U.S. PATENT DOCUMENTS

| | | | |
|---|---|---|---|
| 2004/0070600 A1* | 4/2004 | Morrisroe | G06F 17/3089 715/738 |
| 2004/0103429 A1* | 5/2004 | Carlucci | H04N 7/163 725/32 |
| 2005/0203849 A1* | 9/2005 | Benson | G06Q 30/04 705/51 |
| 2006/0107302 A1* | 5/2006 | Zdepski | H04N 21/23424 725/135 |
| 2006/0167769 A1* | 7/2006 | Chan | G06Q 30/02 705/26.1 |
| 2006/0287912 A1* | 12/2006 | Raghuvamshi | G06Q 30/02 705/14.4 |
| 2007/0033531 A1* | 2/2007 | Marsh | G06F 17/30864 715/738 |
| 2007/0039019 A1* | 2/2007 | Collier | H04N 5/50 725/37 |
| 2007/0088805 A1* | 4/2007 | Cyster | G06F 17/30899 709/217 |
| 2007/0233748 A1* | 10/2007 | Chang | G06F 17/30884 |
| 2008/0215416 A1* | 9/2008 | Ismalon | G06F 17/30867 705/14.54 |
| 2008/0215436 A1* | 9/2008 | Roberts | G06Q 30/0207 705/14.1 |
| 2008/0313669 A1* | 12/2008 | Acharya | H04L 65/605 725/34 |
| 2009/0013272 A1* | 1/2009 | Ohara | G03G 15/55 715/764 |
| 2009/0013347 A1* | 1/2009 | Ahanger | G06Q 30/02 725/36 |
| 2009/0076892 A1* | 3/2009 | Rolf | G06F 17/30749 705/14.64 |
| 2009/0271778 A1* | 10/2009 | Mandyam | G06Q 10/06 717/171 |
| 2009/0282013 A1* | 11/2009 | Joshi | G06F 17/3089 |
| 2010/0034522 A1* | 2/2010 | Ng | G06Q 30/02 386/326 |
| 2010/0050227 A1* | 2/2010 | Acharya | H04L 12/1868 725/151 |
| 2010/0057566 A1* | 3/2010 | Itzhak | G06F 17/30873 705/14.53 |
| 2010/0082673 A1* | 4/2010 | Nakano | G06F 17/3089 707/776 |
| 2010/0083305 A1* | 4/2010 | Acharya | H04N 21/44004 725/34 |
| 2010/0114706 A1* | 5/2010 | Kosuru | G06Q 30/02 705/14.55 |
| 2010/0131870 A1* | 5/2010 | Park | G06F 3/0481 715/760 |
| 2010/0169910 A1* | 7/2010 | Collins | G06Q 30/0251 725/14 |
| 2010/0217885 A1* | 8/2010 | Acharya | H04L 12/185 709/231 |
| 2010/0235232 A1* | 9/2010 | Lee | G06Q 30/02 705/14.43 |
| 2010/0269128 A1* | 10/2010 | Gordon | H04N 7/17318 725/25 |
| 2010/0306039 A1* | 12/2010 | Green | G06Q 30/02 705/14.4 |
| 2010/0332329 A1* | 12/2010 | Roberts | G06Q 30/02 705/14.66 |
| 2011/0066499 A1* | 3/2011 | Anatolievich | G06Q 30/02 705/14.56 |
| 2011/0082755 A1* | 4/2011 | Itzhak | G06Q 30/02 705/14.69 |
| 2011/0125593 A1* | 5/2011 | Wright | G06Q 30/02 705/14.73 |
| 2011/0213655 A1* | 9/2011 | Henkin | G06Q 30/00 705/14.49 |
| 2011/0295681 A1* | 12/2011 | Bhadury | G06Q 30/02 705/14.48 |
| 2011/0307337 A1* | 12/2011 | Wilson | G06Q 30/0267 705/14.64 |
| 2012/0054028 A1* | 3/2012 | Tengler | G01C 21/3697 705/14.49 |
| 2012/0150633 A1* | 6/2012 | Chung | G06Q 30/0241 705/14.49 |
| 2012/0158519 A1* | 6/2012 | Edwards | G06Q 30/0272 705/14.68 |
| 2012/0158524 A1* | 6/2012 | Hintz | G06Q 30/0277 705/14.73 |
| 2012/0323676 A1* | 12/2012 | Dublin | G06Q 30/02 705/14.42 |
| 2015/0066656 A1* | 3/2015 | Edwards | G06Q 30/0272 705/14.68 |

\* cited by examiner

TIME-TRIGGERED ADVERTISEMENT REPLACEMENT

PRIORITY CLAIM

This application is a continuation of and claims priority to U.S. application Ser. No. 12/973,954, filed Dec. 21, 2010 and issued as U.S. Pat. No. 8,918,331, which is hereby incorporated by reference in its entirety.

BACKGROUND

Embodiments of the present invention relate generally to the field of online advertisements.

Advertising on the Internet allows a large number of advertisements to be displayed to a user while browsing web pages. These advertisements are replaced with new advertisements to monetize web pages. The replacement occurs in response to, for example, a user selecting a new web page during browsing. However, there may be scenarios where the user navigates to a particular web page, views advertisements displayed on the current web page and continues to remain on the current web page. The user remaining on the current web page interacts with the current web page but does not interact with the advertisements displayed on the current web page. At this point the advertisements are not replaced until the web page is changed. Consequently, the number of advertisements displayed in a particular timeframe is limited. Further, the rate of monetization of these web pages is also affected.

In light of the foregoing discussion, there is a need for a robust method and system for time triggered advertisement replacement.

SUMMARY

To address the above needs, a method, computer program product, and system are provided.

An example of a computer-implemented method for placing online advertisements includes the step of displaying a primary advertisement on at least a portion of a first web page. The method also includes the steps of initiating a timer to measure a first predetermined period of time that the first web page is displayed and responsive to expiration of the first predetermined period of time, switching the primary advertisement to display a secondary advertisement on the portion of the first web page.

An example of a computer program product stored on a non-transitory computer-readable medium that when executed by a processor, performs a method for placing online advertisements that includes the steps of displaying a primary advertisement on at least a portion of a first web page and initiating a timer to measure a first predetermined period of time that the first web page is displayed. The computer program product is further responsive to expiration of the first predetermined period of time the primary advertisement is switched to display a secondary advertisement on the portion of the first web page.

An example of a system to place online advertisements includes a display output to render a primary advertisement on at least a portion of a first web page. The system also includes a timer to measure a first predetermined period of time that the first web page is displayed and an advertisement controller, coupled to the display output and the timer, to switch the primary advertisement to display a secondary advertisement on the portion of the first web page responsive to expiration of the first predetermined period of time.

Advantageously, advertisement effectiveness is improved by serving advertisements to an active user.

BRIEF DESCRIPTION OF THE FIGURES

In the following drawings, reference numbers are used to refer to like elements. Although the following figures depict various examples of the invention, the invention is not limited to the examples depicted in the figures.

DETAILED DESCRIPTION OF THE EMBODIMENTS

Figure 1:
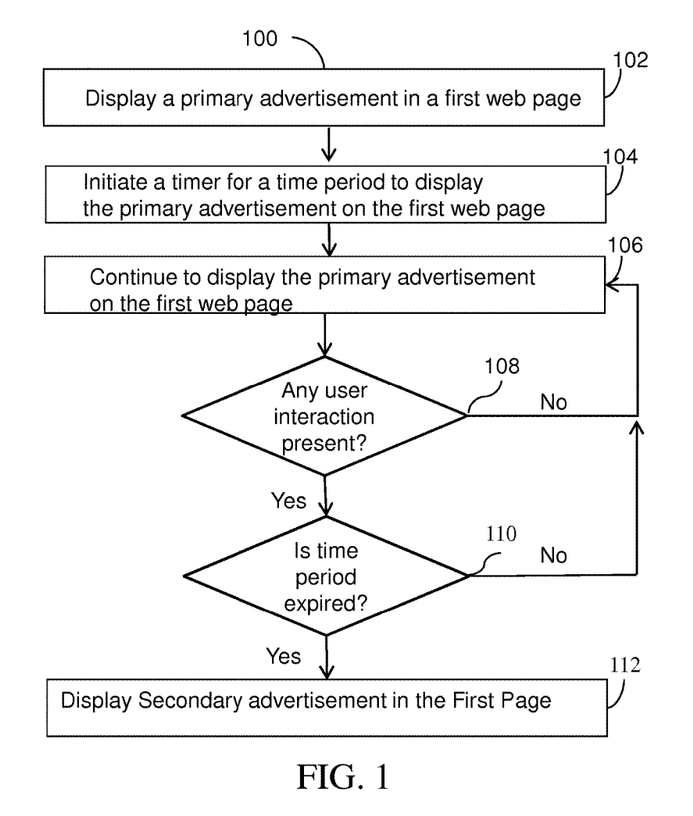
FIG. 1 is a flowchart illustrating a method for placing online advertisements in accordance with an embodiment.

FIG. 1 is a flowchart illustrating a method 100 for placing online advertisements in accordance with an embodiment of the present disclosure.

At step 102, a primary advertisement is displayed in a first web page. A user logs in a web browser and inputs a uniform resource locator (URL), for example http://en.wikipedia.org. A web browser is a software application, such as Internet Explorer or Mozilla Firefox, for accessing information on the World Wide Web. The web browser then loads the first web page. A web page is, in one example, a document consisting of text, images, advertisements and hypertext links. The web page can be implemented in any suitable format, such a Hypertext markup language (HTML), Hypertext Preprocessor (PHP), Flash, and the like. An advertisement can be text, an image, video or animation related to, for example, a product or service. In one embodiment, the advertisement can click-through to a new page showing more detailed information. The advertisement can be located in a static position, or dynamically move across a web page. In targeted advertising, the advertisement is selected from a group of possible advertisements based on information deduced about the user such as web page content, user age, user location, browser search history, time until an event, and the like.

The first web page displays the primary advertisements for the user to view. Further, the user can navigate through different web pages by accessing the hypertext links. As the user navigates, different advertisements are displayed. Similarly, advertisements displayed on the first web page may be replaced after a certain period of time. The replacement occurs if there is evidence of a user being present. The evidence can be a user action, for example, scrolling, key presses, text entry mouse movements and joystick movements. Use of an HTML type web page in a desktop web browser in this disclosure is merely exemplary. Hence, other networked applications, processes or daemons that display advertisements can be used such as a video or an audio player application, a Java application, or a video game.

The primary advertisements displayed on the first web page can expire based on one or more parameters. Examples of parameters include, but are not limited to, the user not interacting with the primary advertisements displayed on the first web page and the user remaining on the first web page for longer than a predetermined time period, thereby increasing the probability of the user getting attracted to a different advertisement on the first web page. In one embodiment, the web page includes several frames, for example, a top frame, a bottom frame, a main and a side frame. The content within a first frames can be changed, independent from a timer controlling advertisements in a second frame. In another embodiment, a web page spawns a secondary window for display of content located in a primary window of the web page, for example, a Java media player to display video corresponding to a link on the web page or a print preview display. The user can cause changes on the secondary window independent from a timer controlling advertisements on the primary window.

At step 104, a timer is initiated for a first time period. The time period can be tracked locally at a computing device or remotely at a server. A time-triggered advertisement replacement allows the primary advertisement to be displayed on the first web page for the first time period. At the end of the first time period the primary advertisement displayed on the first web page is replaced by a secondary advertisement. In one embodiment, a time period is based purely on time. In other embodiments, the timer is relative to events on the web page, such as length of a video. For example, an advertisement can be toggled half way through a music video being played.

The time-triggered advertisement replacement also includes, the secondary advertisement being replaced by one or more levels of advertisements. Examples of levels of advertisements include, tertiary, quaternary, senary, septenary, octonary, nonary and denary. An advertisement set stores the one or more levels of advertisements. The advertisements in the advertisement set can be cycled subsequently on reaching the last advertisement on the advertisement set.

At step 106, in one embodiment, the primary advertisement continues to be displayed on the first web page within a predetermined time period 110, and then a secondary advertisement 112 is displayed. Thus, advertisements are replaced based on time, whether or not there are any intervening user interactions. For example, three advertisements can be rotated, each advertisement being displayed for 10 seconds between rotations. In an alternative embodiment as shown, time period expiration is checked as shown in 110 only after a user interaction is detected as shown in 108, prior to step 112. In still another embodiment, expiration of the timer period 106 triggers a wait for detection of a user interaction 108, prior to step 112, Returning to step 110, the user interaction with the first web page is detected. If user interaction is present, step 112 is performed. Further, if the user interaction is not present, step 110 is performed.

The user interaction with the first web page is determined by various actions performed by the user on the first web page. Examples of various actions include, but are not limited to, mouse movement, scrolling, filling out a form on the web page, highlighting text for example copy and paste operations, submitting a search query, clicking a hyperlink, selecting a checkbox, interacting with a Java application, switching browser tabs or application windows, and one or more key presses.

The user interaction can include an interaction with the first web page other than the portion containing the primary advertisement. In some embodiments, other parameters or criteria, for example relevance, pricing, priority, targeting can also be checked for identifying the advertisements.

In response to the user interaction with the first web page, the primary advertisement displayed on the first webpage is replaced by the secondary advertisement as shown in step 112. When the user interaction with the first web page is undetected, the time-triggered advertisement replacement iterates the detection of user interaction with the first web page as shown in step 110.

At step 112, the primary advertisement displayed on the first web page is replaced by the secondary advertisement. The replacement of the first advertisement with the second advertisement is performed in responsive to the user interaction as detected in step 110. The replacement is performed based on the interaction by the user, with the first web page. The primary advertisement is replaced with the secondary advertisement in response to the user interaction with the first web page at the end of the first time period.

Each advertisement is associated with a predetermined time period. The predetermined time period for each of the advertisement is chosen based on the advertisement campaign and the fee charged by an advertisement publisher to publish each of the advertisement. For example, the first time period is based on a first level of advertisement service and the secondary advertisement is associated with a second time period, differing from the first time period. The second time period is based on a second level of advertisement service.

The primary advertisement and the secondary advertisement displayed on the first web page are based on the interest of the user, the actions performed by the user and the current time of day. The timer is initiated to measure the second time period for which the secondary advertisement is displayed on the first web page. At the end of the second time period, the secondary advertisement is replaced by a tertiary advertisement and is displayed on the first web page. The process of advertisement replacement continues until the final advertisement stored in an advertisement set is reached. The advertisement set comprises a group of advertisements that the advertisers chooses to display.

Advertisements capturing the user interest can be replaced before the user interacts with the advertisement of interest. The primary advertisement that is replaced by the secondary advertisement before the user interacts with the primary advertisement can be reloaded on to the first web page. The user places a request to the web browser to recall the primary advertisement after switching to the secondary advertisement has occurred on the first web page. Thereafter, the primary advertisement is reloaded on the first web page.

Figure 2:
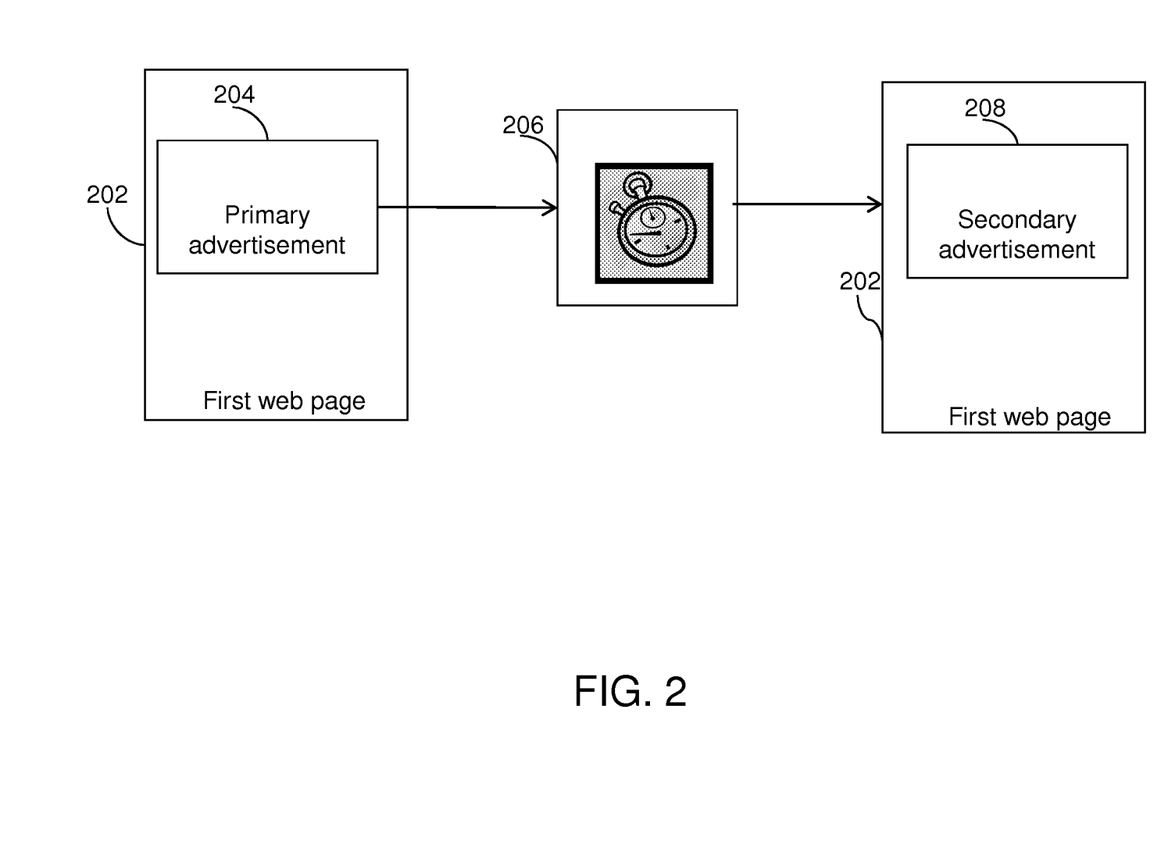
FIG. 2 is a block diagram illustrating a first web page including a primary advertisement placed in accordance to one embodiment.

FIG. 2 is a block diagram illustrating a first web page 202 including a primary advertisement 204 placed in accordance to one embodiment. The first web page 202 can be displayed responsive to when the user inputs a URL to a web browser. A timer 206 is initiated for a first time period. The primary advertisement 204 is displayed on the first web page 202 until the end of the first time period.

The advertisements may be classified as primary, secondary, tertiary depending on the online behavior of the user. For example, for a user interested in booking tickets for a vacation, advertisements pertaining to different modes of transportation can be considered. In one embodiment, targeted advertisements are displayed. In relation to the above example, targeted advertisements may include, but are not limited to tickets for different modes of transportation, tourist sites to visit, prominent hotels and restaurants, rental cars, and shopping malls.

In an embodiment, the advertisement replacement in the web page will occur only when the user interest has been determined. The user interaction with the first web page is determined by various actions performed by the user on the first web page. Examples of various actions include, but are not limited to, mouse movement, scrolling, and one or more key presses. On detecting the user interaction with the first web page, the primary advertisement displayed on the first web page 202 is replaced by a secondary advertisement 208. There can be any number of advertisements for various implementations.

Figure 3:
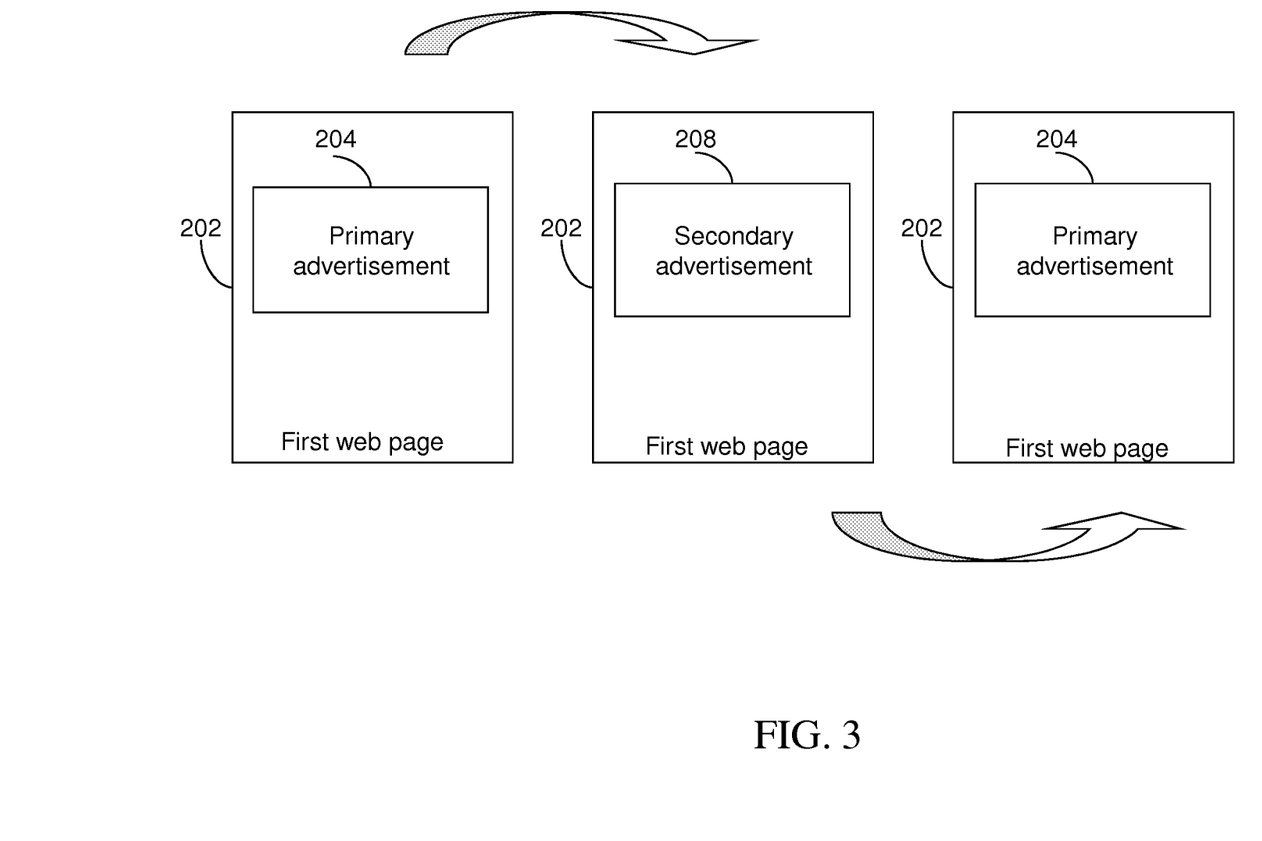
FIG. 3 is a block diagram illustrating a first web page including a primary advertisement recall in accordance to one embodiment.

FIG. 3 is a block diagram illustrating a first web page including a primary advertisement recall in accordance to one embodiment.

A first web page 202 containing a primary advertisement 204 is displayed to a user when the user inputs a URL of the first web page 202 to the web browser. The primary advertisement 204 is displayed on the first web page until the end of the first time period. At the end of the first time period, the primary advertisement 204 displayed on the first web page 202 is replaced by a secondary advertisement 208. The primary advertisement 204 is replaced by the secondary advertisement 208, before the user interacts with the primary advertisement 204. The primary advertisement 204 that is replaced by the secondary advertisement 208 before the user interacts with the primary advertisement is reloaded on to the first web page 202. The first web page 202 displays the reloaded primary advertisement 204. The rotation can continue for a certain number of rotations, a certain time period, or indefinitely.

Figure 4:
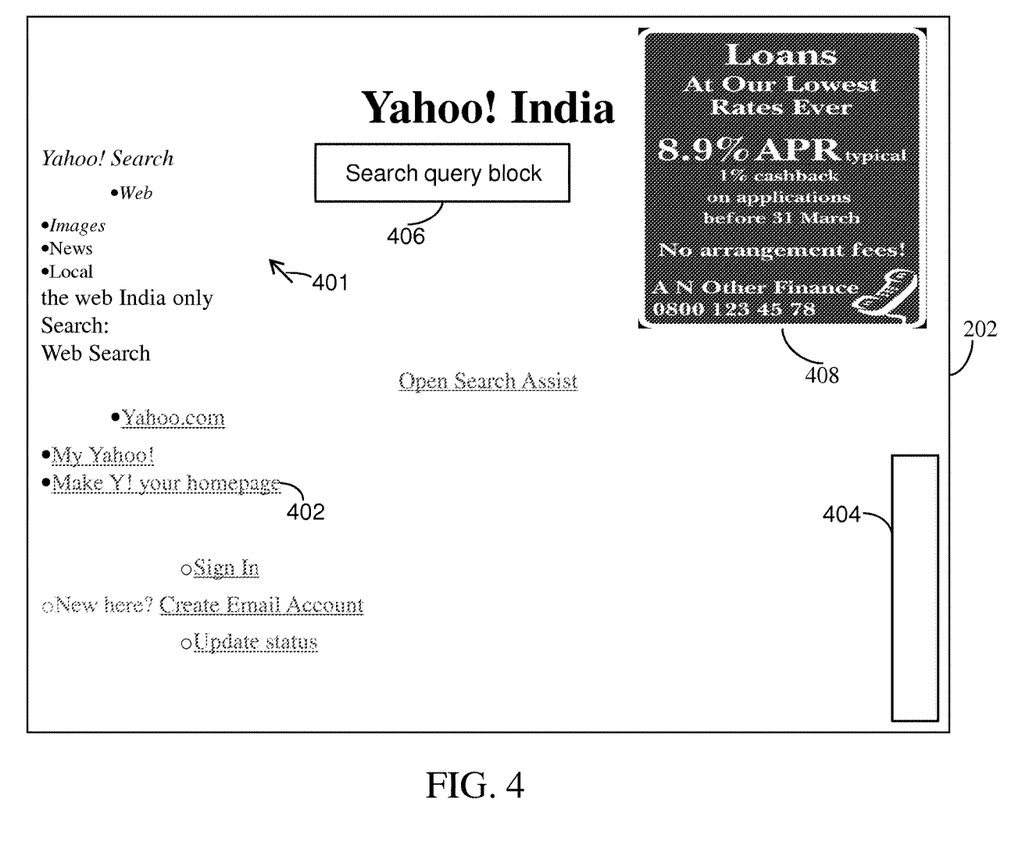
FIG. 4 is a schematic representation illustrating an user interaction on a first web page in accordance to one embodiment.

FIG. 4 is a schematic representation illustrating a user interaction on a first web page 202 with a sample advertisement 408 in accordance to one embodiment.

In an example of time triggered advertisement replacement, FIG. 4 shows a first web page 202 including options for conducting search using Yahoo! Search. The first web page 202 includes the options for searching various contents. Examples of contents include, but are not limited to, web pages, images and news. As the user views the contents of the first web page 202, the user interaction with the first web page 202 is determined. The user interaction with the first web page is determined by various actions performed by the user on the first web page 202. Examples of various actions to the first web page 202 include, but are not limited to, movement of a mouse-controlled cursor 401 over hyperlinks 402, scrolling a view up or down 404, filling out a form on the web page, highlighting text for example copy and paste operations, submitting a search query 406, clicking a hyperlink, selecting a checkbox, interacting with a Java application, switching browser tabs or application windows, and one or more key presses. In one embodiment, user interactions are captured by a windowing system of an operating system. In another embodiment, user interactions are captured by an application such as a web browser. In one example, the user interaction is of the type that does not interrupt display of the first web page 202 for example an action that causes a new page to be loaded. Notification can be sent to an advertisement controller which responds with a different advertisement for display in accordance with the methods described herein.

The first web page 202 includes a sample advertisement 408 that is displayed on the first web page 202 when the user inputs the URL to the web browser. A timer and an advertisement control present in the web browser are initiated to measure a first time period for which the sample advertisement 408 is displayed on the first web page 202. As the user moves the cursor over the first web page to click over any hyperlink, the user can be directed to another web page including one or more advertisements pertaining to the hyperlink clicked by the user.

Figure 5:
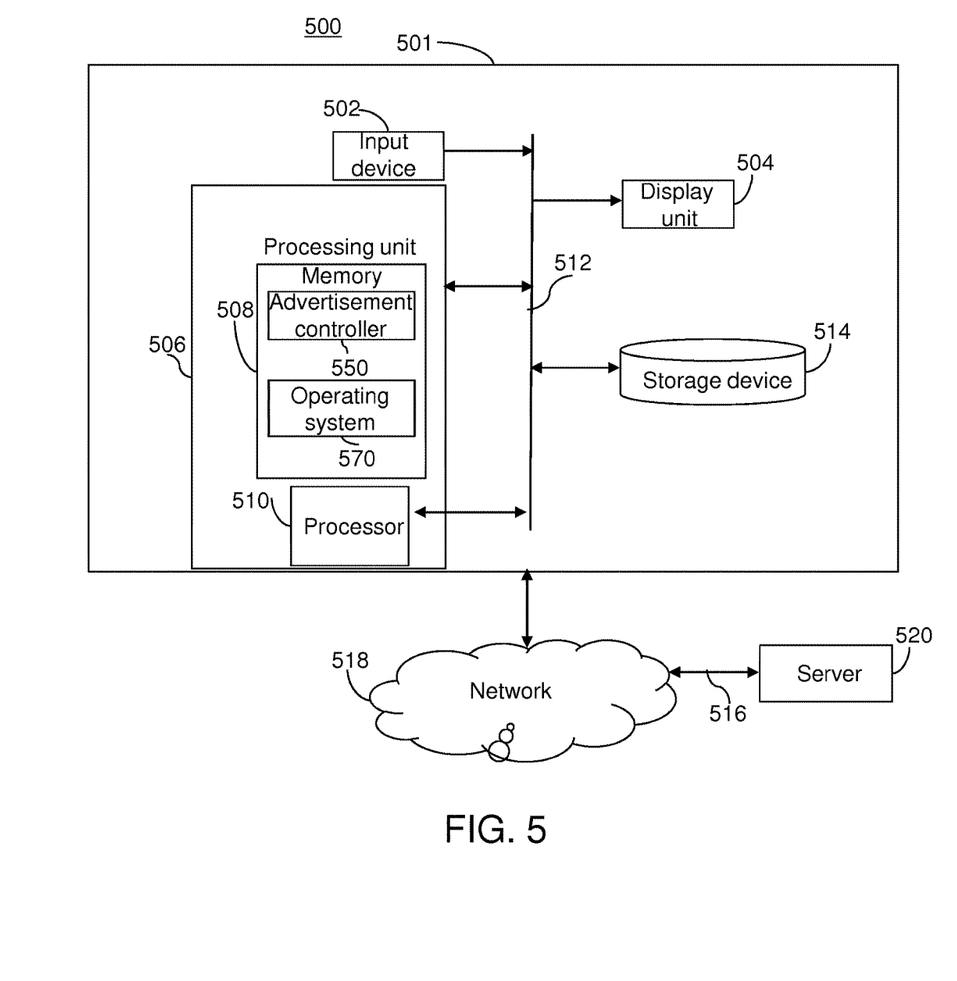
FIG. 5 is a block diagram of an exemplary system for displaying online advertisements, in accordance with which various embodiments can be implemented.

FIG. 5 is a block diagram of an exemplary system 500 for displaying online advertisements, in accordance with which various embodiments can be implemented. The exemplary system can implement methods discussed above.

The system 500 includes a computing device 501 processing unit 506. The computing device 501 can be, for example, a personal computer, a laptop computer, a pad computer, a smart phone, a PDA, a video game, or any other processor-based device. The processing unit 506 includes a memory 508, such as a Random Access Memory (RAM) or a dynamic storage device, coupled to a bus interface 512 for storing information and instructions to be executed by processor 510. The processor 510 can be a CPU, a mobile CPU, a specialized processor, or the like. A storage device 514 for example a hard drive is coupled to bus interface 512 for storing information and instructions. The computing device 501 may be coupled via bus interface 512 to a display unit 504 for displaying information to a user. The display unit 504 can be, for example, a computer monitor or a cell phone screen. An input device 502, including a mouse, pointer, or a keyboard having alphanumeric and other keys, is coupled to bus interface 512 for communicating information and command selections to processor 510.

The memory 508 includes program instructions for an advertisement controller 550. The advertisement controller 550 can be a stand-alone module, integrated as part of a browser, integrated into a web page, located remotely or distributed. Additionally, the memory 508 can include an operating system 570 including a Windows desktop or an open-source operating system.

The display unit 504 displays a primary advertisement on a first web page. A timer is initiated for a first time period. The primary advertisement is displayed on the first web page until the end of the first time period.

At the end of the first time period, the advertisement controller 550 replaces the primary advertisement with a secondary advertisement on the first web page. The advertisement controller replaces the primary advertisement with the secondary advertisement when the user interacts with the first web page. In the previous embodiment, the advertisement controller 550 is located locally on processing unit 506. In other embodiments, the advertisement controller 550 is located remotely on a web page server that generates the web pages.

Embodiments of the invention are related to the use of the system 500 for implementing the techniques described herein. In an embodiment of the invention, those techniques are performed by the system 500 in response to processor 510 executing one or more sequences of one or more instructions included in memory 508. Such instructions may be read into memory 508 from another machine-readable medium product, such as storage device 514. Execution of the sequences of instructions included in memory 508 causes processor 510 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

The term "machine-readable medium product" as used herein refers to any medium that participates in providing data that causes a machine to operation in a specific fashion. Examples of the machine-readable medium product include, but are not limited to, memory devices, tapes, disks, cassettes, integrated circuits, servers, online software, download links, installation links, and online links.

In an embodiment implemented using computer system 500, various machine-readable medium products are involved, for example, in providing instructions to processor 510 for execution. Computer system 500 also includes a communication interface 516 coupled to bus interface 512. Communication interface 516 provides a two-way data communication coupling to a network 518 that is coupled to a server 520. The server 520 might transmit a requested code for an application program through the network 518 and the communication interface 516.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this detailed description, but only by the following claims.

What is claimed is:

1. A system to place online advertisements, the system comprising:
   a display output to render a primary advertisement on a portion of a web page;
   a timer to measure a first predetermined period of time that the web page is displayed; and
   an advertisement controller, coupled to the display output and the timer, the advertisement controller configured to:
      during a continuous time period that the display output continuously displays the web page:
         switch the primary advertisement to display a secondary advertisement on the portion of the web page; and
         in response to a request to recall the primary advertisement for display on the portion of the web page after the switching has occurred, switch the secondary advertisement with the primary advertisement on the portion of the web page.

2. The system of claim 1, wherein the advertisement controller switches the primary advertisement to display the secondary advertisement in response to a time-triggered event.

3. The system of claim 2, wherein the time-triggered event comprises the expiration of the first predetermined period of time.

4. The system of claim 3, wherein the primary advertisement is switched to the secondary advertisement when there is no user interaction with the primary advertisement during the first predetermined period of time.

5. The system of claim 2, wherein the time-triggered event comprises expiration of a timer associated with a video being played on the web page.

6. The system of claim 1, wherein the advertisement controller switches the primary advertisement to display the secondary advertisement in response to a user interaction event.

7. The system of claim 6, wherein the user interaction event comprises an interaction with the web page other than the primary advertisement.

8. The system of claim 1, wherein the web page is accessed from a mobile device.

9. The system of claim 8, wherein the mobile device is a cell phone and the primary advertisement is displayed on a screen of the cell phone.

10. A computer-implemented method for placing online advertisements on a display of a computer device coupled to a communication network, the method comprising:
    displaying a primary advertisement on a web page on the display;
    initiating a timer to measure a first predetermined period of time that the web page is displayed;
    during a continuous time period that the display continuously displays the web page:
       responsive to an event associated with the web page, switching the primary advertisement to display a secondary advertisement on the portion of the web page on the display;
       receiving a request to recall the primary advertisement for display on the portion of the web page after the switching has occurred; and
       in response to the request, switching the secondary advertisement with the primary advertisement on the portion of the web page.

11. The method of claim 10, wherein the primary advertisement is switched to display the secondary advertisement in response to a time-triggered event.

12. The method of claim 11, wherein the time-triggered event comprises the expiration of the first predetermined period of time.

13. The method of claim 11, wherein the time-triggered event comprises expiration of a timer associated with a video being played on the web page.

14. The method of claim 10, wherein the primary advertisement is switched to display the secondary advertisement in response to a user interaction event.

15. The method of claim 10, wherein the computer device is a mobile computing device.

16. The method of claim 15, wherein the mobile computing device is a cell phone and the primary advertisement is displayed on a screen of the cell phone.

17. A non-transitory computer-readable medium storing computer executable instructions comprising:
    instructions to display, on a display of a computing device configured to display a web page, a primary advertisement on a portion of the web page;
    during a continuous time period that the display continuously displays the web page:
       instructions to switch the primary advertisement to display, on the display of, a secondary advertisement on the portion of the web page in response to an event associated with the web page;
       instructions to receive a request to recall the primary advertisement for display on the portion of the web page after the switching has occurred; and
       instructions to switch the secondary advertisement with the primary advertisement in response to receipt of the request.

18. The non-transitory computer-readable medium of claim 17, wherein the event associated with the web page comprises a time-triggered event or user interaction event associated with the web page.

19. The non-transitory computer-readable medium of claim 17, wherein the web page is accessed from a mobile computing device.

20. The non-transitory computer-readable medium of claim 19, wherein the mobile computing device is a cell phone and the primary advertisement is displayed on a screen of the cell phone.

* * * * *